United States Patent [19]

Hertz

[11] 4,196,437

[45] Apr. 1, 1980

[54] METHOD AND APPARATUS FOR FORMING A COMPOUND LIQUID JET PARTICULARLY SUITED FOR INK-JET PRINTING

[76] Inventor: Carl H. Hertz, Skollänksvägen 8, S 223 67, Lund, Sweden

[21] Appl. No.: 883,583

[22] Filed: Mar. 6, 1978

Related U.S. Application Data

[63] Continuation-in-part of Ser. No. 762,054, Jan. 24, 1977, abandoned.

[30] Foreign Application Priority Data

Feb. 5, 1976 [SE] Sweden ............................ 7601235

[51] Int. Cl.² .......................................... G01D 15/18
[52] U.S. Cl. ................................. 346/1.1; 118/325; 239/10; 239/426; 427/426; 346/75
[58] Field of Search .................... 346/75, 140 R, 1; 239/426, 434, 314, 10, 102; 427/22, 23, 426; 118/325

[56] References Cited

U.S. PATENT DOCUMENTS

| | | | |
|---|---|---|---|
| 2,512,743 | 6/1950 | Hansell | 346/75 X |
| 2,925,312 | 2/1960 | Hollmann | 346/75 X |
| 3,211,377 | 10/1965 | Brenner | 239/1 |
| 3,380,584 | 4/1968 | Fulwyler | 209/3 |
| 3,710,933 | 1/1973 | Fulwyler et al. | 209/3 |
| 3,737,914 | 6/1973 | Hertz | 346/75 |
| 3,924,974 | 12/1975 | Fischbeck | 346/75 X |
| 4,106,032 | 8/1978 | Miura | 346/140 R |

OTHER PUBLICATIONS

Miller, Norman A., Ink Jet Density Enhancement; Xerox Discosure Journal, vol. 2, No. 1, Jan./Feb. 1977.

Primary Examiner—Joseph W. Hartary
Attorney, Agent, or Firm—Bessie A. Lepper

[57] ABSTRACT

Method and apparatus for providing a compound liquid jet of fine droplets, particularly suitable for ink-jet recording systems. A primary stream is formed by ejecting under pressure a primary liquid from a nozzle and then causing the primary stream to traverse a thin layer of a secondary fluid to form a compound liquid stream which breaks up to form a compound jet of fine droplets each containing both the primary liquid and the secondary fluid. Since only the primary liquid passes through the nozzle, it may be chosen to minimize, or even eliminate, nozzle clogging and other difficulties associated with the use of most inks in ink-jet systems. The secondary fluid may contain fine particulate material, e.g., pigments, and it is used to contribute color or other physical properties to the compound jet.

76 Claims, 17 Drawing Figures

METHOD AND APPARATUS FOR FORMING A COMPOUND LIQUID JET PARTICULARLY SUITED FOR INK-JET PRINTING

This application is a continuation-in-part of my application Ser. No. 762,054 filed Jan. 24, 1977 claiming the priority of Swedish application Ser. No. 7601235-0 filed Feb. 5, 1976, under 35 U.S.C. 119, and now abandoned.

This invention relates to the formation of liquid jets formed of small droplets and more particularly to method and apparatus for forming compound liquid jets for so-called ink-jet printing.

Over the past ten years, greater interest has been shown in and much effort has been devoted to the development of various methods and apparatus for utilizing ink jets for different recording purposes. In an article entitled "Ink Jet Printing" in IEEE Transactions on Electron Devices ED-19, April 1972, page 584, Kamphoefner has given an account of these methods. It appears from this article that only two fundamentally different methods make use of a liquid jet which is generated by forcing an ink under high pressure through a nozzle. These methods are described by Sweet in U.S. Pat. Nos. 3,596,275 and 3,373,437, and by Hertz and Simonsson in U.S. Pat. No. 3,416,513. The method of Sweet comprises electrically charging the jet and then deflecting it by means of controllably charged deflection plates into the desired position on a recording paper. In contrast, according to the method of Hertz and Simonsson, the jet is charged to such an extent that it is dispersed to form a spray which is then prevented from reaching the recording paper through the use of a transverse electric direct voltage field. Both of these methods have been further developed and found various applications.

A liquid jet which emerges from a nozzle under high pressure spontaneously breaks up, shortly after its emergence, at the so-called point of drop formation into droplets which are then directed towards the recording paper. In the methods of both Sweet and Hertz et al, these droplets are charged by electric influence from a control electrode which encloses the point of drop formation and to which a signal voltage has been connected. The droplets are then caused in both methods to pass through an electric direct voltage field which is generated between two electrodes at right angles to the direction of the jet.

In addition to the above-described methods, various other methods have been developed in which a sudden pressure increase in a chamber filled with ink forces a droplet through a fine nozzle towards a recording paper. The pressure increase is usually brought about by a piezoelectric crystal which is supplied with a voltage pulse each time a droplet is to be projected towards the paper. Examples of such devices, generally known as "on-demand" ink-jet systems, are given by Stemme in U.S. Pat. No. 3,747,120 and by Williamson in U.S. Pat. No. 3,452,360.

All of these prior art methods suffer from the serious drawback that they require inks having very special properties to achieve reliable functioning which is substantially free of supervision and maintenance. The reason for this lies primarily in the fact that the diameter of the nozzle must be kept small in all such ink-jet methods, varying between 5 and 300 $\mu$m. This involves two disadvantages. First, a filter must be mounted in the conduit carrying the ink to the nozzle in order to prevent small particles and other impurities in the ink from reaching the nozzle and clogging it. Second, the ink dries in the nozzle when the apparatus is not used for a period of time. This also results in clogging the nozzle. Because of these inherent disadvantages, ink-jet inks must meet several requirements if efficient and essentially trouble-free operation of an ink-jet system is to be attained.

One of these requirements is that the ink must be of low viscosity to be able to pass both the filter and the nozzle without too great a loss of pressure. Moreover, the ink must not contain any large amount of small particles since these clog the filter even if they are so small that they would pass through the nozzle. Therefore, it is not possible to use inks, for example conventional India ink, which contain coloring pigments, in ink-jet systems. The ink must, rather, consist of one or more dissolved colorants, e.g., dyes, which generally do not provide as good a contrast and do not possess the same light-fastness as pigment colors. Thus this requirement for particle-free inks has heretofore seriously restricted the use of ink-jet systems.

In order to prevent the ink from drying in the nozzle during the standstill periods of the apparatus, ink-jet inks are generally formulated of a colorant and a liquid which dissolves the colorant. The colorant solvent is one which is essentially incapable of drying. An example of such an ink is a mixture of water and glycerine, in which the water can dissolve certain colorants and the glycerine can prevent the ink from drying even after the greater portion of the water has evaporated. However, most water-soluble colorants, upon evaporation of the water, form an undesirably hard compound with the glycerine or they are precipitated because of their increasing concentration in the glycerine. This will generally clog the nozzle and lead to operational trouble in the recorder, or in less serious cases this situation changes the direction of the ink jet.

While a pure water-glycerine mixture practically never dries completely, and therefore never clogs the nozzle, there are only a very few colorants which do not form a solid residue when drying in the nozzle. This in turn severely restricts the choice of colorants and their maximum concentration in the ink. Similar difficulties also arise when other solvents such as various alcohols are used.

In addition to these two main requirements which ink-jet inks must satisfy there are also other conditions that the ink must satisfy to be suitable for use in the above-mentioned ink-jet methods. These additional requirements further restrict and make the choice of a suitable ink difficult. For example, the two first-mentioned methods (of Sweet and of Hertz et al) require that the ink exhibits a good electric conductivity. Moreover, another difficulty may arise in those recording systems wherein it is desirable or necessary to change inks. This is brought about since most colorants react chemically with one another, a fact which results in the filter in the ink supply conduit being clogged even though the system is thoroughly flushed at the time the inks are changed. Finally, in many ink types it is necessary to include fungicides and bactericides to prevent growth of microorganisms which may also clog the filter and the nozzle.

Although the method and apparatus of this invention are particularly suited for ink-jet systems, it will be appreciated that the novel aspects of the invention are also equally applicable to the handling of liquids in other liquid jet systems incorporating the formation of very small liquid droplets by ejecting a liquid stream through a small nozzle and otherwise susceptible to the disadvantages discussed above. Therefore, even though the invention is hereinafter, for convenience, described in terms of forming droplets in in-jet systems, it is alwo within the scope of the invention to use the method and apparatus described in other types of liquid droplet systems.

These disadvantages and drawbacks associated with the presently used inks for ink-jet systems, as well as with other types of liquid jet streams, clearly indicate that there is a real need for an improved method and apparatus for providing the ink droplets making up the ink-jet stream or liquid droplets making up liquid-jet streams for other applications.

It is therefore a primary object of this invention to provide an improved method for forming droplets in liquid jet systems and particularly in ink-jet systems. It is another object to provide a method of the character described which in effect removes most, if not all, of the restrictions now placed on ink-jet ink, thus making it possible to use a much wider range of inks including those containing driers and pigments or other fine particulate material. An additional object is to provide such a method which makes it possible to rapidly and effectively change inks in any one ink-jet system. Yet a further object of this invention is to provide a method for forming droplets in ink-jet systems which imparts increased reliability to the system while decreasing maintenance cost.

It is another primary object of this invention to provide an improved apparatus for forming a stream of fine liquid droplets and particularly for forming a jet stream of fine droplets in an ink-jet system. A further object is to provide apparatus of the character described which in effect removes many of the restrictions now placed on ink-jet inks and thus makes it possible to use a much wider range of inks in ink-jet systems than is now feasible. Yet another object is to provide apparatus for forming a stream of fine droplets in an ink-jet system which permits the rapid and efficient change of inks, which achieves increased reliability of operation and which decreases maintenance time and cost.

It is yet another primary object of this invention to provide improved ink-jet recording apparatus, the improvement lying in the ability to form fine ink droplets containing particulate material such as one or more pigments.

Other objects of the invention will in part be obvious and will in part be apparent hereinafter.

In accordance with one method aspect of this invention, there is provided in an ink-jet recording method wherein a jet of fine droplets of a liquid are controllably directed onto a receptor surface, the improvement comprising forming the jet of fine droplets by ejecting under pressure a primary liquid from a nozzle through a thin layer of a secondary fluid to form a liquid stream which breaks up at a drop formation point into a jet of fine droplets which is characterized as constituting a compound jet of the primary liquid and the secondary fluid. In preferred embodiments of the method of this invention the primary liquid is particle-free and the secondary fluid is a pigment-containing liquid thus making it possible to produce highly colored, light-fast recordings or copy.

In accordance with another method aspect of this invention, there is provided a method of forming a jet of fine droplets, comprising the steps of ejecting under pressure a primary liquid stream from the outlet of a nozzle; and providing at the outlet of the nozzle a thin layer of a predetermined thickness of a secondary fluid whereby the primary stream traverses the thin layer to form a compound jet of the primary liquid and the secondary fluid which breaks up at a drop formation point beyond the surface of the thin layer to form a compound jet of fine droplets.

According to one apparatus aspect of this invention there is provided novel apparatus to form a jet of fine liquid droplets, particularly suited for incorporation into an ink-jet system, which comprises, in combination, nozzle means, means to eject under pressure a stream of a primary liquid through the nozzle means; and means to provide a thin layer of a secondary fluid at the outlet of the nozzle means whereby the stream of the primary liquid traverses the thin layer of the secondary fluid, and the resulting compound stream forms a compound jet of fine liquid droplets at a drop formation point beyond the limit of the thin layer. In preferred embodiments of this apparatus, means are also provided to maintain the thin layer of secondary fluid at a constant thickness and, if required, to damp out any pressure waves in the secondary fluid. Alternatively, the secondary fluid can be supplied to the nozzle by a constant-flow device.

According to another apparatus aspect of this invention there is provided new and improved apparatus for ink-jet recording comprising, in combination, a nozzle, a source of a primary liquid of a character suitable for ejection under pressure through the nozzle, a source of a secondary fluid, means to provide around the outlet of the nozzle a thin layer of the secondary fluid, the surface of which extends beyond the outlet of the nozzle by a predetermined distance, means to maintain the predetermined distance essentially constant, pumping means for pumping the primary liquid under pressure through the nozzle to form a stream of the primary liquid which traverses the thin layer of the secondary fluid to form a compound liquid stream which breaks up at a drop formation point to form a compound jet of fine liquid droplets; a receptor surface; and means to controllably direct at least a portion of the fine liquid droplets in a predetermined pattern onto the receptor sheet.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

In accordance with this invention it is possible to overcome most of the serious restrictions now placed on the types of ink suitable for present-day ink-jet systems by providing means which permit increasing the diameter of the opening from which the ink jet emerges. To produce, nevertheless, an ink jet of suitably small diameter fine droplets, for instance diameters of from 10 to 50 $\mu$m, which are a prerequisite for a good resolution of the tracing produced by the ink-jet on the recording medium, use is made in the present invention of a fine liquid jet, preferably without any colorant. This liquid jet, hereinafter called the "primary jet," emerges at a high speed from a nozzle of small diameter, for instance 5 to 100 $\mu$m. Inasmuch as the primary liquid jet need not and preferably does not contain any colorant, e.g., pigment particles, essentially none of the above-mentioned difficulties normally occurring in the production of fine ink jets for recording purposes are encountered. Although the primary liquid may contain fine particulate material sized small enough to pass the filter used in the liquid supply line and the nozzle, it will generally be preferable to use a particle-free liquid to form the primary jet. Hence, for convenience of description and to set forth the preferred embodiments of the method and apparatus of this invention, particularly as they refer to their incorporation in ink-jet systems, the primary liquid will be described as being "uncolored."

The primary uncolored liquid jet is directed towards the recording medium in the same way as in the conventional ink jet methods. To provide a visible tracing on the recording medium the uncolored primary jet directly after leaving the nozzle traverses a thin layer of an essentially stationary secondary fluid, e.g., a liquid ink. In a simple embodiment of the method and apparatus of this invention, the nozzle lies submerged in the secondary fluid in immediate proximity to the interface of the secondary fluid and the air, and it is oriented in such a way that the jet of primary liquid emerging from the nozzle breaks through the surface of the secondary fluid approximately at right angles. If the distance from the nozzle to the surface of the secondary fluid is no greater than a few millimeters, the jet of primary liquid breaks through the surface of the secondary fluid and forms a colored compound liquid stream in the air. This compound liquid stream can be observed in the air beyond the surface of the secondary fluid while the primary jet exists only below the surface of the secondary fluid. The diameter of the compound liquid stream is somewhat larger and its speed somewhat lower than that of the uncolored primary liquid stream. However, the compound liquid stream spontaneously breaks up into a jet of fine liquid droplets at a drop formation point shortly after emerging from the surface of the secondary fluid in the same manner as the low conventional liquid jets. The resulting compound jet of fine droplets can therefore be influenced in a known manner by electric signals, as described for example in the patents to Sweet and to Hertz et al mentioned above. In most instances these fine droplets will comprise a combination of an uncolored liquid from the primary jet and colored ink from the secondary fluid thus providing a colored tracing on the recording paper. It is, of course, also within the scope of this invention to use primary and secondary liquids which react to produce a colored product or which combine in some other manner to give a desired end result. Exemplary of the latter is the use of a liquid monomer and a polymerization initiator as the two liquids.

For a fuller understanding of the nature and objects of the invention, reference should be had to the following detailed description taken in connection with the accompanying drawings in which FIGS. 1 and 2 illustrate diagrammatically the manner in which the compound jet is generated in accordance with this invention and one particular embodiment of the apparatus of this invention;

Figure 1:
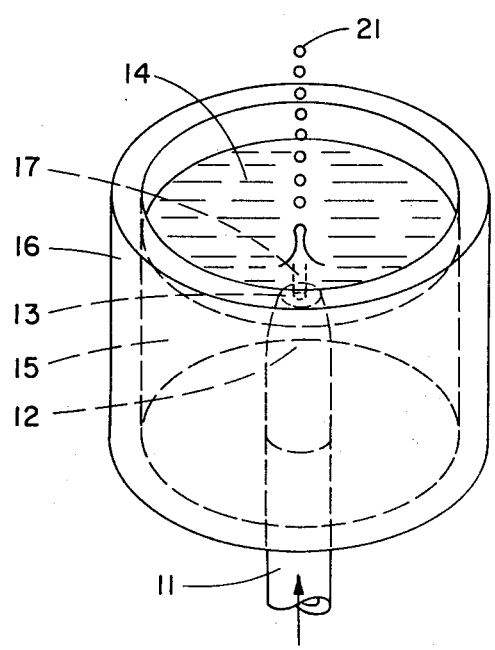
Figure 2:
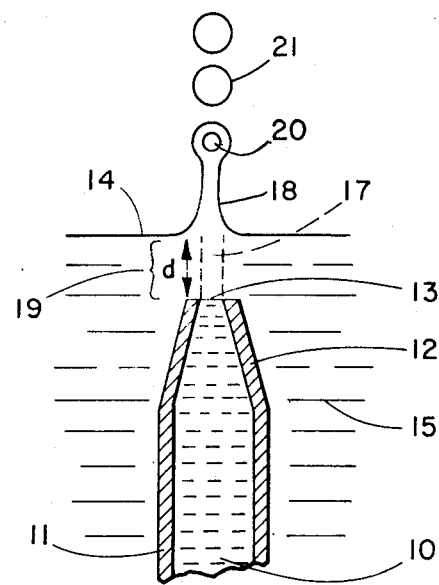

FIGS. 1 and 2 illustrate the generation of a compound jet in accordance with this invention. In the following description it will, for the sake of convenience, be assumed that the primary liquid is a colorless, particle-free liquid and the secondary fluid is a colored ink which may contain fine particulate material, e.g., a pigment. As will be seen in FIGS. 1 and 2, the colorless primary liquid 10 is supplied through a conduit 11 and forced under high pressure through a nozzle 12, the outlet 13 of which lies below the surface 14 of the secondary liquid 15 (e.g., colored ink) in an open-top container 16. For ink-jet systems, the diameter of nozzle 12 typically ranges between about 5 and 100 $\mu$m and the pressure of primary liquid 10 is typically between about 5 and about 100 kg/cm$^2$. In this way a primary liquid stream 17 is generated which travels at high speed through ink 15 towards the surface 14 thereof, thereby carrying along a small quantity of the ink 15. By the time that the resulting compound jet 18 reaches and breakes through ink surface 14 it is no longer colorless but has assumed the color of the ink. The diameter of the compound jet is slightly greater than that of the primary liquid stream and its speed is somewhat less. The magnitude of these changes is in part dependent upon the distance d between the outlet of nozzle 12 and the surface 14 which is, in effect, the thickness of the thin layer 19 of the secondary liquid through which primary liquid stream 17 traverses. The magnitude of these changes in stream diameter and stream speed is also in part dependent upon the properties of the two liquids 10 and 15. It may be mentioned by way of example that a primary stream liquid 17 emerging under a pressure of 50 kg/cm$^2$ from a nozzle having a diameter of 15 $\mu$m has a speed of about 40 m/sec. This speed is reduced by about 50% to 75% when the jet breaks through the surface 14 and forms the compound stream 18, the diameter of which may be approximately 1.5 to 2 times greater than the diameter of the nozzle. The distance between the nozzle and the liquid surface, i.e., the thickness of layer 19, in this example ranges between about 0.2 and 0.5 millimeter and the viscosity of the liquids 10 and 15 is of the order 1 centipoise.

Shortly after its formation above the ink surface 14, the compound stream 18 spontaneously breaks up at the point of drop formation 20 into fine droplets 21 which travel as a compound jet of droplets following after each other through the air in the same way as in the normal liquid jets, which has been described in such U.S. Pat. Nos. as 3,416,153 and 3,373,437. As a consequence, all techniques for electrically controlling ink jets for recording purposes by electric charging of the droplets can also be utilized for the control of the compound jet of fine droplets 21. This especially applies to the methods described in U.S. Pat. Nos. 3,596,275 and 3,416,153.

It is obvious that the present invention offers great advantages over previously known methods of generating a liquid jet for recording purposes since the primary liquid 10 need not contain any colorant or other fine particulate material. Elimination of any particulate material in the primary liquid forced under pressure through nozzle 12 in turn eliminates most of the difficulties previously mentioned. Simultaneously, much less stringent requirements are placed on the secondary liquid, e.g., ink 15, than heretofore encountered. Thus for example, since the drying properties of the secondary liquid are of minimal concern, the choice of colorants, or other particulate materials, is nearly unlimited, thus making it, of course, possible to even use pigmented inks to good advantage. The color concentration and thus the contrast can, with the use of such pigmented inks, also be increased. Furthermore, nozzle 12 is generally submerged in the secondary fluid 15, which means that it is protected against clogging during downtime. As opposed to earlier systems, the method and apparatus according to this invention permit a rapid change of the ink 15, which may be of interest if it is desired, for example, to change recording color. Finally, it may be mentioned that a colorless and pigment-free primary liquid 10 will not clog the filter of an ink jet system even after long-term use. This, of course, considerably increases the reliability and life span of ink-jet systems incorporating the apparatus of this invention.

Since the role of the primary liquid is principally that of forming a primary stream 17 which issues under pressure from nozzle 12, it is necessary that this primary liquid should be one which can form a final compound stream 18 capable of breaking up into the desired compound jet of fine liquid droplets 21 which are relatively uniform in diameter and which retain their desired direction of travel toward the means employed to controllably direct their final direction. Therefore, it is necessary, at least to some extent, to match the primary liquid with the secondary liquid chosen. For example, it has been found that when India ink was used as a secondary liquid, mixtures of water (up to about 80% by weight) and glycerine or ethanol (making up the remainder) were particularly effective. However, when all water or 95% water/5% glycerine or alcohol mixtures were used in the same system, the compound jet became irregular and resembled a spray with a very slight divergence. Such a compound jet of fine droplets was not acceptable for premium quality ink-jet recording.

It is not known precisely why the addition of a minor amount of a component such as glycerine or ethanol to the water forming the primary liquid produces a marked improvement in the quality of the compound jet of fine droplets. It has, however, been observed from high-speed photographs of the formation of the compound jet that a minimum of mixing of the two liquids takes place during the time the primary liquid stream 17 (FIGS. 1 and 2) traverses the thin layer 19 of the secondary liquid. This then indicates that the amount of any turbulence created in the surface layer of the primary stream should be below that which materially disturbs the process of drop formation and/or affects the trajectories of the individual fine droplets of the compound jet formed. It therefore seems possible to postulate that the addition of a water-miscible liquid, e.g., glycerine, ethyl alcohol, a higher alcohol, a polyglycol or the like, formed of relatively large molecules, compared to water, in effect stabilizes the primary jet stream against surface turbulence. Although there is no intention to be bound by this particular theory, it is within the scope of this invention to choose a primary liquid which forms a primary jet stream upon being ejected under pressure from a nozzle which is capable of traversing the secondary fluid to form a compound jet which breaks up into fine droplets suitable for ink-jet recording. It is readily within the capability of anyone skilled in the art to choose, without any undue experimentation, a primary liquid which meets these requirements, i.e., one which does not give rise to the creation of turbulence above that level at which any undesirable changes in the character (e.g., uniformity and direction of the liquid droplets) of the resulting compound liquid jet are effected.

In contrast to the role of the primary liquid, the role of the secondary fluid is that principally of contributing color or other physical properties to the compound jet of fine droplets. In most cases for ink-jet recording systems, this secondary fluid will be a liquid ink, containing, if desirable, finely divided pigment particles. Any particulate material suspended in the secondary fluid should be sized such that the individual particles are smaller than the diameter of the nozzle through which the primary liquid is ejected.

It is preferable that the primary and secondary liquids have approximately the same viscosity and that the viscosity of either liquid range from that of water, i.e., about one centipoise to about 20 centipoises.

It is obvious that the primary liquid 10 and the secondary fluid 15 are not restricted to any specific types of liquids and that the secondary fluid need not necessarily be an ink. Thus, it may be advantageous for the secondary fluid 15 to also be a colorless liquid which, on mixing with the primary liquid 10 in the primary jet 17, forms a colored compound jet which leaves a tracing on a recording surface. Alternatively, the liquids 10 and 15 can be so selected as to chemically react with one another in the compound jet either as they travel towards the recording medium or when they have impinged upon it. Such a tracing may be in the form of a protective film on the recording surface. The film formed in this manner may, for instance, consist of a polymerized chemical compound which is formed when the liquids 10 and 15 mix with one another or when this mixture comes in contact with the recording medium. Finally, the secondary fluid 15 may even comprise a fine powder since, as such, a powder may also be accelerated by the primary liquid stream 17 and be mixed with it if the particle size of the fluid powder is less than the diameter of the primary liquid jet. To facilitate this, the powder can be fluidized by means of a suitable air stream blown through the powder vertically with regard to the axis of the primary jet and in the direction opposite to gravity.

Figure 3:
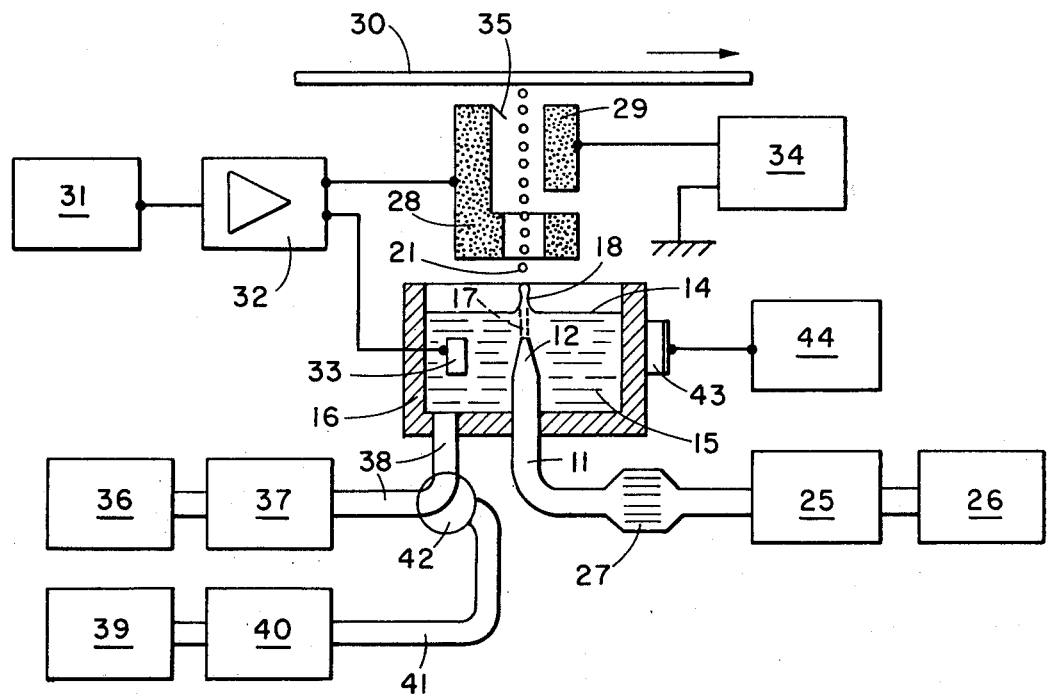
FIG. 3 illustrates one embodiment of an ink-jet recording apparatus employing the compound jet of this invention and the apparatus embodiment of FIG. 1.
Figure 16:
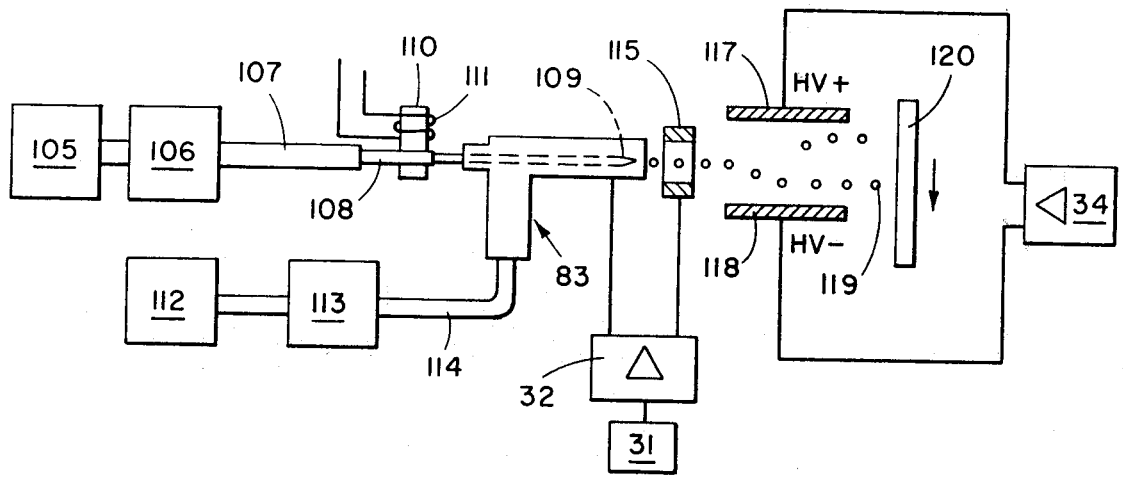
FIG. 16 illustrates an ink-jet system constructed in accordance with the teaching of Sweet and incorporating the apparatus of FIG. 11.
Figure 17:
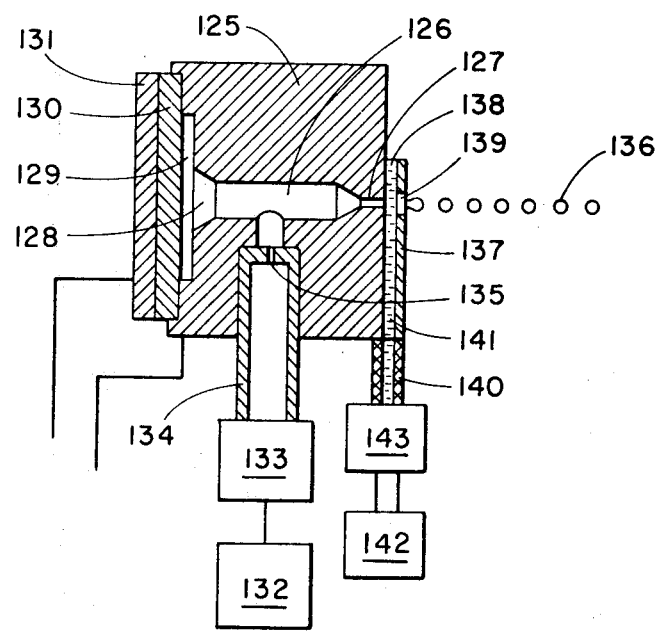
FIG. 17 illustrates an ink-jet system constructed in accordance with the teaching of Stemme and incorporating the apparatus of this invention for forming a compound jet.

FIG. 3 illustrates one embodiment of an ink jet recording system incorporating this new method and apparatus of generating a compound liquid jet. In the embodiment of FIG. 3, an electrode system is used for on/off modulation of the compound liquid jet of fine droplets 21 and is in accordance with the teaching of Hertz in U.S. Pat. No. 3,916,421. If will, of course, be realized that any other system for electric control of liquid jets can be used instead, and two other such exemplary systems are shown in FIGS. 16 and 17 described below.

In the apparatus of FIG. 3, a high-pressure pump 25 pumps the primary liquid from a primary liquid supply tank 26 through the filter 27 and conduit 11 to nozzle 12 from which the primary liquid jet stream 17 emerges, and in the manner already described generates the colored compound jet of fine liquid droplets 21. By inserting conduit 11 through the wall of container 16 such that nozzle 12 is immersed in the secondary liquid, there is provided means to maintain the outlet of the nozzle in spaced relation with surface 14. The compound jet 21 then travels through the electrode system 28 and 29 and leaves on the recording medium 30 a tracing when the medium 30 moves in the direction of the arrow. For on/off modulation of the tracing, an electric signal from a signal source 31 is applied via an amplifier 32 between the control electrode 28 and the ink 15 in the container 16. In a preferable arrangement, this is accomplished by submerging an electrode 33 in ink 15. Alternatively, the container 16 may itself be made electrically conductive and be used as electrode 33. As has been described by Hertz in U.S. Pat. No. 3,916,421, the droplets of the compound jet 21 are electrically charged if a signal of some hundred volts is generated by the amplifier 32, and this results in these droplets' being deflected towards the control electrode 28 in the electrical field established between electrodes 28 and 29 by means of a high voltage source 34. A sharp edged member 35 attached to electrode 28 prevents the charged droplets from reaching the recording medium 30.

To maintain the distance between outlet 13 of nozzle 12 and surface 14 of ink 15 constant, fresh ink is pumped from the secondary liquid container 36, via the pump 37 and the conduit 38, into the container 16 at a constant and controllable rate of flow, thereby determining and controlling the diameter of the droplets of the compound liquid jet. This can be realized by controlling the rate of operation of pump 37 in such a manner that the level of ink 15 in container 16 is essentially constant. To this end, use is made of a conventional type liquid-level indicator (not shown), for example, a wire which comes into contact with the surface 14 of ink 15 as soon as the level thereof exceeds a predetermined value. Alternatively, the level can be kept constant by an overflow pipe. For a rapid change-over to another ink or to a flushing liquid, one or more further supply tanks 39 with suitable pumps 40 can be connected to the container 16 via conduit 41 and a multi-way valve 42. The pumps must then be reversible, e.g., peristaltic pumps. Alternatively, the container 16 can be emptied in the same way after a period of recording is completed.

To improve the quality of the tracing, it has proved preferable to control the drop formation process at the point of drop formation 20 (FIG. 2) in a known manner with the aid of mechanical vibrations. These may be generated, for example, by a piezoelectric crystal 43 which is fixed to the wall of container 16 and is driven by the oscillator 44. This use of mechanical vibratory motion is not, however, essential to the functioning of the recording apparatus, but it does improve apparatus performance by reducing the drop size and making the drop formation frequency more regular. (See for example the article of Mansson in *Physica Scripta*, Vol. 4, pages 221-227 (1971).)

Figure 4:
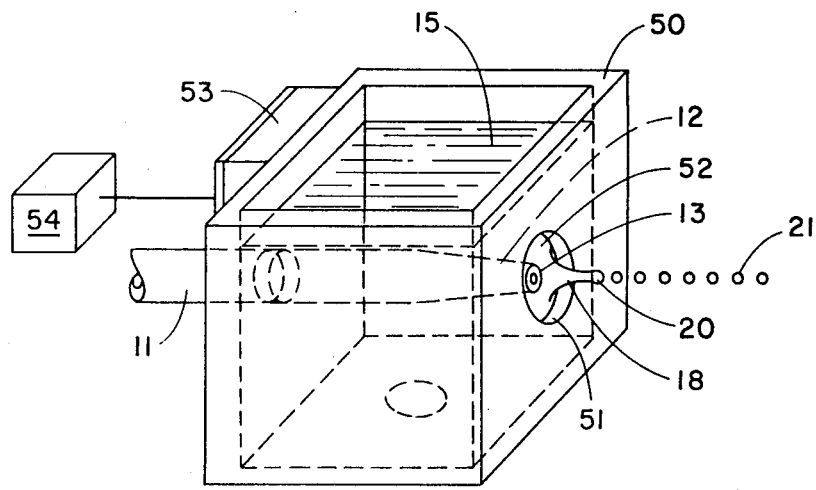
FIG. 4 illustrates another embodiment of the apparatus of this invention.
Figure 5:
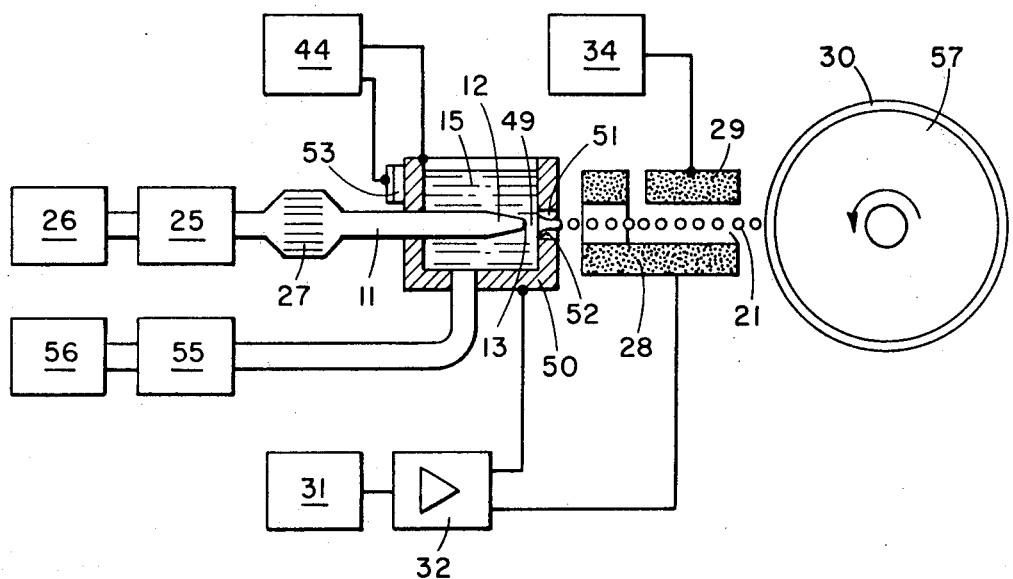
FIG. 5 illustrates an ink-jet recording apparatus incorporating the apparatus embodiment of FIG. 4.

In many applications it may not be suitable or desirable to be under the necessity of orienting secondary liquid container 16 as shown in FIG. 3. The apparatus shown in FIGS. 4 and 5 provides an example of how to avoid the necessity of having to rely on the forces of gravity to maintain the desired relationship of the nozzle and secondary liquid. In the embodiment of FIGS. 4 and 5 the surface tension forces of the secondary liquid 15 are used to prevent it from flowing out of a small orifice so long as the hydrostatic pressure of the secondary fluid is not too high.

In this alternative embodiment of the invention, the secondary liquid container 16 of FIG. 3 is replaced by a container 50 as shown in FIG. 4. In one side of container 50, which may typically be about 1 cubic centimeter in size, there is an aperture 51 of from about 0.5 to about 3 millimeters in diameter, which means that the diameter of aperture 51 is preferably at least five times that of the diameter of nozzle 12 (defined previously as ranging between about 5 and 100 $\mu$m). If container 50 is filled with secondary liquid ink 15, e.g., so that the ink level lies only insignificantly above the top edge of aperture 51, the ink 15 will not flow out of the aperture but will form there a free continuous surface 52 relative to the air because of its surface tension properties. Of course, the most suitable hydrostatic pressure can also be realized by means of a pump, in which case the container 50 may be fully closed on all sides except at aperture 51.

If nozzle 12 at the end of primary fluid supply conduit 11 is arranged in immediate proximity to the free ink surface 52 in aperture 51, as shown in FIG. 4, and a jet of a suitable primary liquid is generated in the manner earlier described, a colored compound jet 18 will emerge from aperture 51, and at the point of drop formation 20 it will spontaneously break up into a compound jet of fine droplets 21. The thin layer 49 of a secondary liquid traversed by the stream of primary liquid is, of course, constituted of that liquid between nozzle outlet 13 and free surface 52. As in the previously described case, the drop formation mechanism of FIG. 5 can be controlled by the mechanical oscillations of piezoelectric crystal 53 having driving means 54.

Typically, this thin layer of secondary liquid may be from about 0.1 mm to about 1 mm thick. In any event, the thin layer of secondary fluid should be such that the speed of the primary stream is reduced by no more than about 90%, and the diameter of the fine droplets is no greater than about ten times the inside diameter of the nozzle.

Since the apparatus illustrated in FIG. 4 generates a compound liquid jet similar to that of FIGS. 1 and 2, it can be used in the same way in an ink-jet recording apparatus. An example of this is illuatrated in FIG. 5, wherein the peripheral equipment is essentially the same as that of FIG. 3. In the embodiment of FIG. 5 the primary liquid jet is generated by pumping the primary liquid from source 26, with the aid of pump 25, through filter 27 and supply conduit 11 to the nozzle 12. At the same time, the ink level in container 50 is kept constant with the aid of the pump 55 which receives ink from the secondary liquid supply tank 56. In the apparatus of FIG. 5, the recording medium 30 is mounted on a rotatable roll 57, thus illustrating an alternative way of rapidly moving the receptor surface 30 relative to the compound liquid jet 21. The means for controllably directing the fine liquid droplets of the compound jet are essentially the same as shown in FIG. 4, being an on/off modulation means responsive to an electrical signal from signal source 31, and including the electrode system comprised of electrodes 28 and 29. As earlier mentioned, any other suitable method for controlling a liquid jet by electric signals may also be used in the apparatus of FIG. 5.

Figure 6:
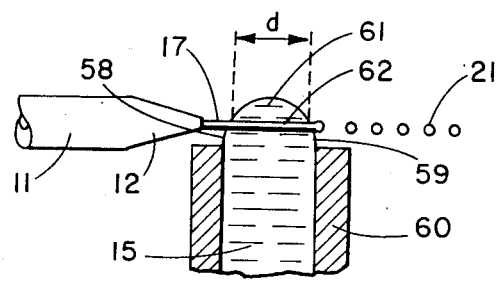
FIGS. 6–9 illustrate four additional modifications in the means for providing a thin layer of the secondary fluid in forming the compound jet.
Figure 7:
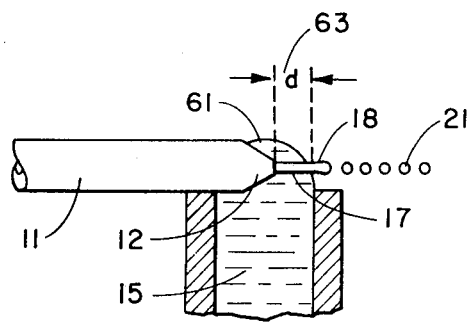

FIGS. 6-9 illustrate two additonal alternative embodiments of the apparatus of the present invention and two different modes of using each of them. Whereas in the embodiments of FIGS. 1, 3 and 4 (as well as in FIGS. 11-14 described below), the thin layer of secondary fluid is provided by immersing the nozzle in a volume of the secondary fluid, in the embodiments of FIGS. 6 and 8 the thin layer of secondary fluid is provided as a column of fluid contained between two fixed surfaces. In both apparatus embodiments of FIGS. 6 and 8, a primary liquid jet 17 emerges from nozzle 12 and traverses the thin layer of ink 15 directly after leaving the nozzle. The primary liquid jet enters through a primary stream inlet surface 58 and the compound jet 18 is formed on the other side of the compound jet discharge surface 59 of ink 15. The two embodiments of FIGS. 6 and 8 differ only in the manner in which the relatively thin layer of ink is formed. In both cases, the surface tension of ink 15 is exploited to realize this. In FIG. 6 the ink 15 emerges from a tube 60 having a diameter of approximately 0.5 millimeter and forming a meniscus 61 at the top thereof. Alternatively, two parallel plates with planar or bent surfaces can be substituted for the tube 60. FIG. 7 illustrates another mode of operating the means of FIG. 6 to provide the thin layer of secondary liquid through which primary liquid stream 17 traverses. Whereas in FIG. 6, the nozzle is positioned to be external of meniscus 61, in FIG. 7 it is positioned within the meniscus, thus again relying upon immersion of the nozzle in the secondary fluid. The difference between these two modes of operation lies, of course, in using thin layers of the secondary liquid of different thicknesses, d, as illustrated diagrammatically and in a gross manner by layers 62 and 63 of FIGS. 6 and 7, respectively.

Figure 8:
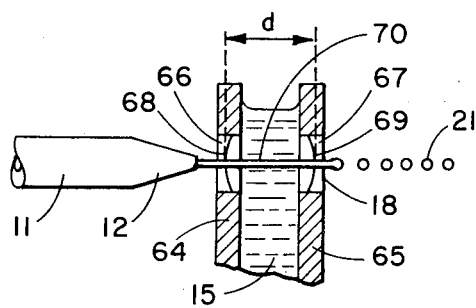
Figure 9:
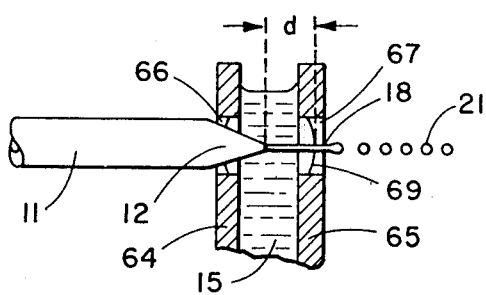

In the means illustrated in FIG. 8, the ink 15 is raised by capillary force between two planar plates 64 and 65 which are maintained in a predetermined relationship spaced about 0.5 millimeter apart. Axially aligned apertures 66 and 67, approximately 1 millimeter in diameter, are provided in the two plates. In both apertures 66 and 67 free liquid surfaces 68 and 69, serving as inlet and discharge surfaces, are formed by the ink 15 defining between them a thin layer 70 of the secondary liquid. The primary jet 17 enters surface 68 while the compound jet 18 leaves the liquid secondary liquid through the other surface 69. As in the comparable situation which obtains in the means of FIGS. 6 and 7, the means of FIG. 8 may also be operated in a different mode wherein nozzle 12 partially penetrates into the secondary liquid to decrease the thickness, d, of layer 71 of the secondary liquid. It is obvious that a compound jet can be generated in accordance with this invention using other geometrical arrangements and that the apparatus described above should therefore be considered only as exemplary. Obviously, a great many closely spaced compound jets can also be used. In such an arrangement, all of the primary jets may be fed from a common high-pressure pump while different secondary liquids may be used with each of these primary jets.

Figure 10:
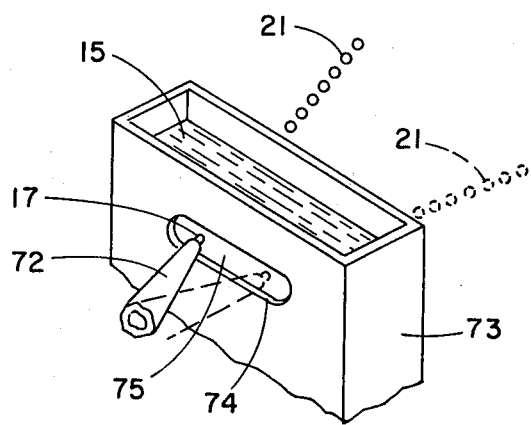
FIG. 10 shows a modification of the apparatus of this invention in which the direction of the compound jet may be altered.

In some applications of the ink-jet technique, use is made of an ink-jet, the direction of which may be periodically varied by vibrating the nozzle back and forth. Apparatus means for accomplishing this vibrating is disclosed by Hertz in U.S. Pat. No. 3,737,914. FIG. 10 shows an example of an apparatus in which the present invention is utilized in such a modification. This is possible since it has been found that the direction of the compound jet depends almost entirely upon the direction of the primary liquid jet and not upon the angle of the surface of the ink 15 to the jet axis. Thus, if the direction of the primary liquid jet is changed in the apparatus embodiments described in FIGS. 1-9, the direction of the compound jet will change in the same way. Use is made of this phenomenon in the apparatus illustrated in FIG. 10 wherein a primary liquid jet 17 emerges from a nozzle 72, the direction of which can be mechanically changed. The secondary liquid is held in a container 73 similar to the one shown in FIG. 8 or 9. In one side of container 73 there is cut a slot 74 through which liquid jet 17 can enter liquid 15 and traverse it in the direction of nozzle 72. The compound jet thus formed then emerges through a corresponding slot (not shown) on the other side of container 73. These slots are arranged in the same way as the apertures 66 and 67 in FIG. 8, and they must be of a size and configuration which permits the surface tension forces of the secondary liquid used to form parallel free faces, e.g., face 75, defining between them the required thin layer of the secondary liquid. Nozzle 72 may be outside of or submerged in secondary liquid 15.

For many applications the means for generating the compound jet of this invention illustrated in FIGS. 1, 4, 6 and 8 are adequate. However, for premium quality ink-jet recording, the above-described means are not easily maintained and operated. The quantity of the secondary liquid carried off and mixed with the primary liquid to form the compound jet is dependent upon the distance between the nozzle outlet and the surface of the secondary liquid, i.e., upon the thickness of the thin layer traversed by the primary jet. Small changes in this layer thickness appreciably alters both the diameter of the fine droplets in the compound jet and the velocity of the droplets striking the recording surface. The first of such alterations changes the quantity and intensity of the ink reaching the surface; and the second changes the registration of copy formed. Inasmuch as it is difficult to precisely maintain this quantity of secondary liquid in these apparatus, it is difficult to prevent such changes from taking place.

Figure 11:
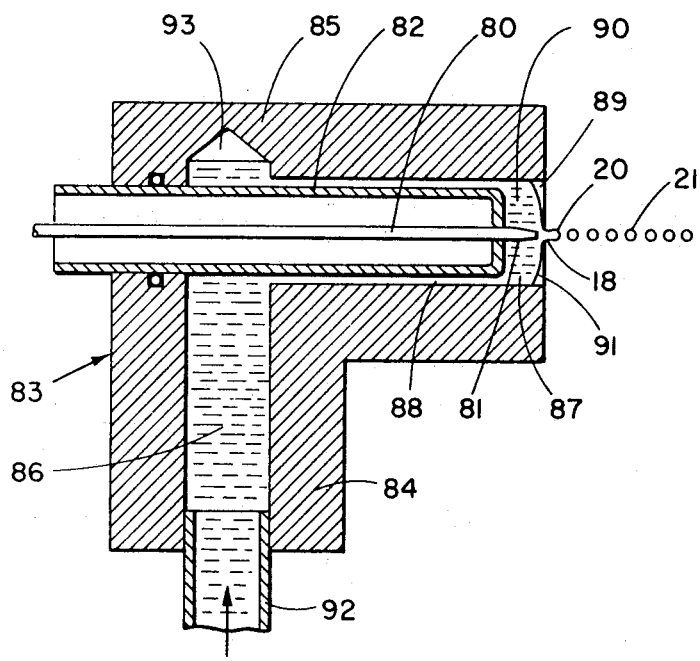
FIGS. 11 and 12 are cross sectional and end views, respectively, of a preferred embodiment of an apparatus for generating the compound jet of this invention.
Figure 12:
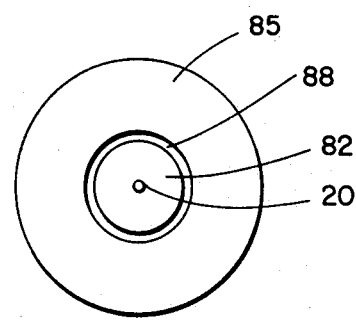
Figure 13:
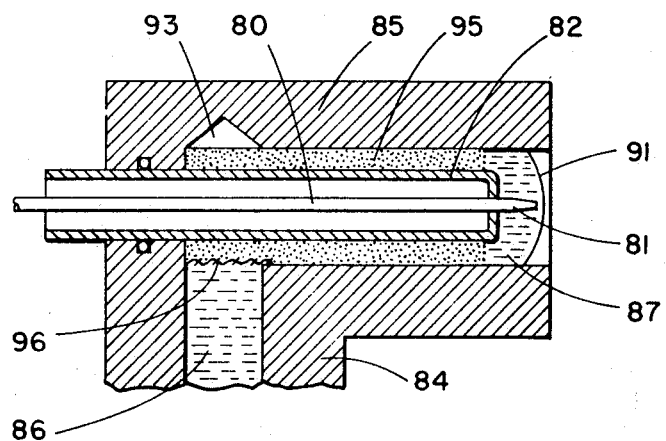
FIG. 13 is a cross section of the apparatus of FIG. 11 illustrating a modification of the secondary fluid damping means.
Figure 14:
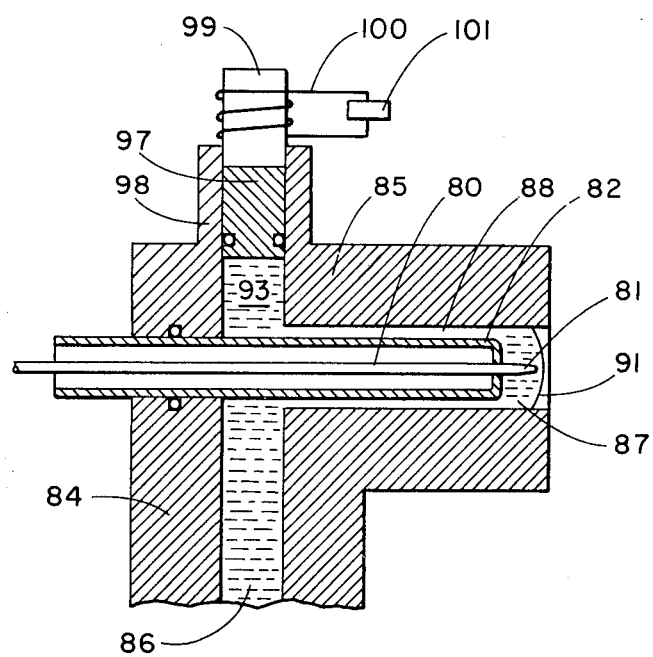
FIG. 14 is a cross section of the apparatus of FIG. 11 showing additional means to maintain and/or vary the pressure on the secondary fluid.

The apparatus embodiments illustrated in FIGS. 11-14, overcome such difficulties by including means to provide a constant flow of the secondary liquid. FIG. 11 depicts the apparatus in the "on" mode; while FIGS. 13 and 14 depict it in the "off" mode. As will be seen in the cross section and end views of FIGS. 11 and 12, this embodiment of the means for generating a compound jet comprises a primary fluid delivery capillary 80 serving as a part of the primary liquid supply means and terminating in a nozzle 81. Capillary 80 is encased within a sheath 82, both ends of capillary 80 extending beyond the sheath. The forward end of sheath 82 is preferably closed with a small aperture to allow capillary 80 to pass therethrough and to be held rigidly aligned within sheath 82 and with respect to the apparatus. Sheath 82 is, in turn, mounted in a secondary liquid delivery gun-type member 83 formed of perpendicularly intersecting tubings 84 and 85 and defining intersecting fluid inlet passage 86 and fluid supply passage 87. Sheath 82 extends through the wall of the delivery gun, is axially aligned with fluid discharge passage 87 and defines with the wall thereof a narrow annular spacing 88 providing fluid communication between passages 86 and 87. Sheath 82 terminates short of discharge end 89 of tubing 85 thus providing for the establishment of a terminal volume 90 of the secondary liquid. The free surface 91 of this volume is maintained through surface tension forces acting upon the secondary liquid. Capillary 80 extends beyond the end of sheath 82 such that the position of the outlet of nozzle 81 defines a predetermined thickness of the thin layer of the secondary liquid between the nozzle outlet and free surface 91.

The secondary liquid is delivered to inlet passage 86 through a conduit 92 (e.g., tubing) in communication therewith by means of a constant-flow pump, e.g., a peristaltic pump. Because the inlet tubing 84 must be connected to a conduit and because such a conduit is normally a flexible tubing susceptible to being moved or shaken, pressure waves can be easily propagated through the secondary liquid to the nozzle if not damped. The use of certain pumps, e.g., peristaltic pumps, can also give rise to undesirable pressure waves. Such pressure waves are immediately apparent in changes in jet diameter and droplet speed. In order to prevent the propagation of such pressure waves, annular passage 88 is made sufficiently narrow to damp them out. The damping effect of annular passage 88 is further enhanced by the presence of an air cushion 93 at the upper end of inlet tubing 86 which makes it possible to control fluid pressure on the secondary liquid.

The following dimensions, which are meant to be illustrative and not limiting, further describe the embodiment of FIGS. 11 and 12. A capillary having an inside diameter of 100 μm and terminating in a nozzle having an outlet diameter of 15 μm was mounted in a metal sheath having an outside diameter of 0.8 mm. The diameter of passage 87 was 1.0 mm, thus providing an annular passage 88 of 0.1 mm. The length of passage 88 was about 4 mm. When a primary fluid consisting of 80% water and 20% glycerine by weight, under a pressure of 700 psi was directed through capillary 80 to traverse a layer of India ink about 0.2 mm thick and delivered at the rate of 5 cubic millimeters per second, a compound jet of fine droplets having an average diameter of 50 μm was formed.

FIG. 13 shows a modification of the apparatus of FIGS. 11 and 12. In this modification the damping means comprise a porous material 95 filling the space between sheath 82 and the wall defining discharge passage 87 and retained therein by a foraminous member such as screen 96. In this modification, the spacing between sheath 82 and passage wall may be greater than in the apparatus of FIG. 11 which relies solely on the width of the annular passage 88 to effect damping.

In the modification of FIG. 14, there is provided means to change the diameter of the compound jet and hence of the fine droplets. These means comprise means to change the pressure on the secondary fluid in passage 87. Exemplary of such means is a piston 97 of magnetic material moving within cylinder 98 through the action of an electromagnet 99 which in turn is energized by coils 100 connected to a power source 101. Piston 97 acts upon the air in air cushion 93 to pressurize and depressurize the secondary liquid in passages 88 and 87. The maximum pressure will, of course, be less than that which exceeds the surface tension forces retaining the secondary liquid in passage 87. In the modification illustrated in FIG. 14, annular passage 88 will be somewhat larger than in the modification of FIG. 11. The frequency at which magnet 99 may be energized may extend over a wide range, up to about 1000 Hertz. Even higher frequencies may be obtained by substituting piston 97 by a piezoelectric device such as used for example by Stemme in U.S. Pat. No. 3,747,120. By varying this frequency it is possible to change the thickness of the layer of secondary liquid which in turn changes the diameter of the droplets which changes the density of the recorded trace. This may be accomplished while maintaining an approximately constant frequency of fine droplet formation.

Finally, it is possible to eliminate sheath 82, particularly in the modifications of FIGS. 13 and 14 where the control over the width of the annular passage defined within discharge tubing 85 is less critical. The principal roles of sheath 82 are the protection and mounting of capillary 80 and the definition of annular passage 88.

Figure 15:
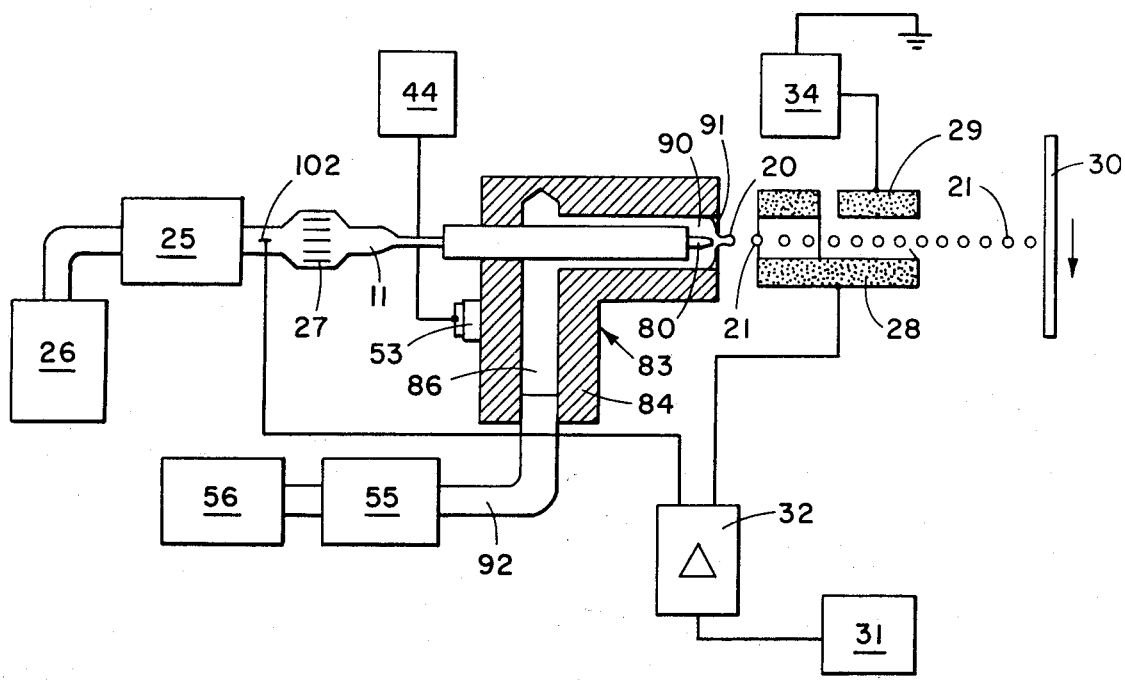
FIG. 15 illustrates an ink-jet system constructed in accordance with the teaching of Hertz and incorporating the apparatus of FIG. 11 to form the compound jet of this invention.

FIGS. 15 and 16 illustrate diagrammatically the incorporation of the compound jet apparatus of this invention in ink-jet recording systems constructed in accordance with the teachings of Hertz in U.S. Pat. No. 3,916,421 and of Sweet in U.S. Pat. No. 3,596,275, respectively. The embodiment of the compound jet apparatus illustrated in FIGS. 15 and 16 is that shown in FIG. 11. It is, of course, within the scope of this invention to use any of the other embodiments shown and described. In FIG. 15, the numbers identify the same components shown in FIGS. 5 and 11.

In the ink-jet system of FIG. 15, the primary liquid is supplied to capillary 80 from source 26 through pump 25, conduit 11 and filter 27. In this system, an electrode 102 is placed in conduit 11 to charge the primary liquid as an alternative to charging the secondary liquid as shown in FIGS. 3 and 5. Thus it will be appreciated that either the primary or secondary liquid may be charged. The secondary liquid is supplied from source 56 by pump 55 through conduit 92 into inlet passage 86 of the compound jet apparatus. Fine, colored droplets 21 making up the compound jet are formed and their deposition is controlled by the mechanism described in detail above.

In the ink-jet system of FIG. 16, the primary liquid is supplied from source 105 by pump 106 into liquid supply line 107 and thence to liquid feed pipe 108 which terminates in nozzle 109. A driving means 110, having driving coil 111, is mounted on feed pipe 108 to impart a vibratory motion to control the formation and mass of the fine droplets. Alternatively, this driving means may comprise a piezoelectric crystal. The secondary liquid from source 112 is pumped by pump 113 through conduit 114 into the compound jet apparatus 83. The secondary liquid, and hence the fine droplets are charged by passage through a charging electrode 115 receiving power from the signal source 31 and amplifier 32. Downstream from charging electrode 115 are parallel, spaced electrostatic deflecting electrodes 117 and 118 defining a constant electrostatic field between them. This electrostatic field is created by voltage source 34. The magnitude of this field determines the disposition of the individual charged droplets 119 on the receptor sheet 120. As in the case of the ink-jet apparatus of FIGS. 5 and 15, the ability to use a particle-free primary liquid and a particle-containing secondary liquid in the ink-jet apparatus of FIG. 16 appreciably minimizes difficulties in nozzle clogging and materially lessens the restrictions heretofore imposed on ink-jet inks.

As noted above, the method and apparatus of this invention are also applicable to ink-jet systems normally designated "on-demand" systems as represented by that described by Stemme in U.S. Pat. No. 3,747,120. Exemplary apparatus illustrating the use of the compound jet technique to an on-demand system is shown in FIG. 17. This apparatus comprises a housing block 125 defining therein a liquid chamber 126 terminating at one end in a discharge channel 127 (nozzle) and at the other end in a flared connecting passage 128 which provides fluid communication with a narrow circular chamber 129 terminating in the face of a metal plate 130. Metal plate 130 is mounted on a piezoelectric crystal 131 driven by suitable means not shown. The primary liquid is delivered into chamber 126 at low pressure from source 132 by means of pump 133 through conduit 134 and intake channel 135. When a voltage pulse is applied to piezoelectric crystal 131 it forces metal plate 130 to flex toward chambers 126 and 124, thus forcing liquid through discharge channel 127 as a stream which, through surface tension forces, breaks up to form a single fine drop 136 for each voltage pulse. In accordance with this invention, there are provided means to furnish a thin layer of a secondary fluid at the outlet of nozzle 127 for the formation of a compound jet. In FIG. 17, these means comprise a front plate 137 spaced from the front face of housing block 125 by a distance, d, which equals the desired width of the thin secondary liquid layer 138. Plate 137 has an aperture 139 aligned with nozzle 127, the diameter of which is normally larger than the diameter of nozzle 127. A tubing 140 provides secondary fluid to the volume 141 defined between front plate 137 and housing block 125 and two end plates not shown. Tubing 140 is, in turn, connected to a source of secondary liquid 142 through a pump 143. In the apparatus of FIG. 17, or in any similar on-demand apparatus, it is relatively easy to maintain the thin layer of secondary fluid at a constant value since the spacing of plate 137 may be fixed at any predetermined distance from the nozzle outlet.

In operation of the method and apparatus of this invention, it has been found preferable to close off the secondary fluid supply first and then shut off the primary liquid supply. This procedure ensures that none of the secondary fluid is taken into the nozzle.

It will be apparent that the above detailed descriptions and drawings that the method and apparatus of this invention make it possible to minimize, or even eliminate, the difficulties heretofore encountered in using certain inks in ink-jet apparatus, to use a much wider range of inks than now possible, and to rapidly and effectively change inks in any one system.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. In an ink-jet recording method wherein a jet of fine droplets of a liquid is controllably directed onto a receptor surface, the improvement comprising forming said jet of fine droplets by ejecting under pressure a primary liquid stream from a nozzle through a thin layer of a different secondary fluid having a free stream discharge surface to form a compound liquid stream which breaks up at a drop formation point into said jet of fine droplets which is characterized as constituting a compound jet of said primary liquid and said secondary fluid.

2. An ink-jet recording method in accordance with claim 1 wherein said primary liquid is one which, in contacting said secondary fluid, does not give rise to the creation of turbulence above that level at which any undesirable changes in the character of said fine droplets are effected.

3. An ink-jet recording method in accordance with claim 1 wherein said primary liquid is a mixture of water and at least one water-miscible liquid having a molecular weight greater than water, wherein said water is present up to about 80% by weight.

4. An ink-jet recording method in accordance with claim 3 wherein said water-miscible liquid is glycerine, ethanol, a higher alcohol or a polyglycol.

5. An ink-jet recording method in accordance with claim 1 wherein said primary liquid is particle-free.

6. An ink-jet recording method in accordance with claim 1 wherein said secondary fluid is a colored ink.

7. An ink-jet recording method in accordance with claim 6 wherein said ink contains finely divided pigment material.

8. An ink-jet recording method in accordance with claim 1 wherein said secondary fluid comprises particulate material, the size of the individual particles of which is less than the inside diameter of said nozzle.

9. An ink-jet recording method in accordance with claim 1 wherein said thin layer is of a thickness such that the speed of the primary liquid stream is reduced by no more than about 90% and the diameter of said fine droplets is no greater than about 10 times the inside diameter of said nozzle.

10. An ink-jet recording method in accordance with claim 1 wherein said secondary fluid is a liquid maintained under essentially atmospheric pressure.

11. An ink-jet recording method in accordance with claim 1 including the step of maintaining said secondary fluid, through the forces of surface tension, across an aperture thereby providing said free stream discharge surface.

12. An ink-jet recording method in accordance with claim 11 wherein the diameter of said aperture is at least five times the diameter of said nozzle.

13. A method of forming a jet of fine droplets, comprising the steps of
(a) ejecting under pressure a primary liquid stream from the outlet of a nozzle in a manner to form a jet of fine liquid droplets; and
(b) providing at said outlet of said nozzle a thin layer of a secondary fluid whereby said primary stream traverses said thin layer to form a compound jet of said primary liquid and said secondary fluid which breaks up at a drop formation point beyond the surface of said thin layer to form a compound jet of fine droplets, said thin layer being of a predetermined thickness and having a free stream discharge surface.

14. A method in accordance with claim 13 wherein said step of providing said thin layer of said secondary fluid comprises immersing said nozzle in a volume of said secondary fluid such that the distance from said nozzle outlet to said surface of said secondary fluid is equal to said predetermined thickness.

15. A method in accordance with claim 14 including the step of maintaining said surface of said secondary fluid constant relative to said outlet of said nozzle.

16. A method in accordance with claim 14 wherein the step of maintaining said surface of said secondary fluid constant relative to said outlet of said nozzles comprises providing said secondary fluid to said thin layer at a constant and controllable rate of flow.

17. A method in accordance with claim 16 including the step of damping out pressure waves in said secondary fluid.

18. A method in accordance with claim 17 wherein said step of damping out said pressure waves comprises directing said secondary fluid through a narrow passageway to said thin layer.

19. A method in accordance with claim 17 wherein said step of damping out said pressure waves comprises directing said secondary fluid through a porous medium.

20. A method in accordance with claim 17 including the step of controlling the fluid pressure on said secondary fluid.

21. A method in accordance with claim 20 wherein said step of controlling said fluid pressure comprises periodically varying said fluid pressure thereby to vary the diameter of said fine droplets forming said compound jet.

22. An ink-jet recording method in accordance with claim 16 including the step of closing off the flow of said secondary fluid prior to ceasing said ejecting of said primary liquid stream from said nozzle, thereby to ensure that essentially none of said secondary fluid is taken into said nozzle at the cessation of the formation of said jet of fine droplets.

23. A method in accordance with claim 13 wherein said step of providing said thin layer of a predetermined thickness of said secondary fluid comprises providing a column of said secondary fluid constrained between two fixed surfaces, one serving as a primary stream inlet surface and the other as said free stream discharge surface.

24. A method in accordance with claim 23 wherein said two fixed surfaces are opposing surfaces of a meniscus of said secondary fluid.

25. A method in accordance with claim 23 wherein said two fixed surfaces are defined within axially aligned apertures in spaced apart plates and maintained through the forces of surface tension acting upon said secondary fluid.

26. A method in accordance with claim 13 wherein said primary liquid is one which, in contacting said secondary fluid, does not give rise to the creation of turbulence above that level at which any undesirable changes in the character of said fine droplets are effected.

27. A method in accordance with claim 13 wherein said primary liquid is a mixture of water and at least one water-miscible liquid having a molecular weight greater than water.

28. A method in accordance with claim 13 wherein said primary liquid is particle-free.

29. A method in accordance with claim 13 wherein said secondary fluid comprises particulate material, the size of the individual particles of which is less than the inside diameter of said nozzle.

30. A method in accordance with claim 13 wherein said secondary fluid is a colored ink.

31. An ink-jet recording method in accordance with claim 13 wherein said primary liquid and secondary fluid react to produce a predetermined desired color.

32. A method in accordance with claim 13 wherein said primary liquid and secondary liquid are chemically reactive.

33. A method in accordance with claim 13 wherein said thin layer is of a thickness such that the speed of the primary liquid stream is reduced by no more than about 90% and the diameter of said fine droplets is no greater than about 10 times the inside diameter of said nozzle.

34. A method in accordance with claim 13 including the step of moving said nozzle back and forth thereby to change the direction of said jet of fine droplets.

35. A method in accordance with claim 34 wherein said nozzle is maintained in contact with said secondary liquid.

36. A method in accordance with claim 13 wherein said secondary fluid is a liquid maintained under essentially atmospheric pressure.

37. A method in accordance with claim 13 wherein said step of providing said thin layer of said secondary fluid at the outlet of said nozzle comprises maintaining said secondary fluid, through the forces of surface tension, across an aperture thereby providing said free stream discharge surface.

38. A method in accordance with claim 37 wherein the diameter of said aperture is at least five times the diameter of said nozzle.

39. A method in accordance with claim 13 wherein said secondary fluid is different from said primary liquid.

40. An ink-jet apparatus wherein there are provided means to form a jet of fine liquid droplets and means to controllably direct said fine liquid droplets onto a receptor surface, characterized in that said means to form said jet of fine liquid droplets comprises, in combination,
 (a) nozzle means;
 (b) means to provide a thin layer of a secondary fluid adjacent the outlet of said nozzle means, said thin layer being of a predetermined thickness and having a free compound jet discharge surface; and
 (c) means to eject under pressure a stream of a primary liquid through said nozzle means and said thin layer of said secondary fluid so as to form a jet of fine liquid droplets, whereby said stream of said primary liquid traverses said thin layer, and the resulting compound stream forms a compound jet of fine liquid droplets at a drop formation point beyond the limit of said thin layer.

41. An ink-jet apparatus in accordance with claim 40 wherein said means to provide said thin layer of said secondary fluid adjacent the outlet of said nozzle means comprises, in combination,
 (a) container means arranged to provide a volume of said secondary fluid and defining said compound jet discharge surface;
 (b) means to maintain said outlet of said nozzle means in spaced relationship to said compound jet discharge surface.

42. An ink-jet apparatus in accordance with claim 41 wherein said means to maintain said outlet of said nozzle means in spaced relationship to said compound jet discharge surface comprises means to maintain said nozzle immersed in said secondary liquid such that the thickness of said thin layer is defined as the distance between said nozzle outlet and said discharge surface.

43. An ink-jet apparatus in accordance with claim 42 wherein said container has an aperture and said discharge surface is maintained across said aperture through the forces of surface tension.

44. An ink-jet apparatus in accordance with claim 43 including means to provide a constant flow of said secondary fluid to said aperture thereby to maintain said predetermined thickness of said thin layer.

45. An ink-jet apparatus in accordance with claim 44 wherein said means to provide said constant flow of said secondary fluid comprises peristaltic pump means and means defining restricted flow passage means between said pump means and said thin layer.

46. An ink-jet apparatus in accordance with claim 45 including pressure wave damping means associated with said restricted flow passage means.

47. An ink-jet apparatus in accordance with claim 43 wherein the diameter of said aperture is at least 5 times the diameter of said nozzle means.

48. An ink-jet apparatus in accordance with claim 41 including means to maintain said discharge surface in a stable position relative to said nozzle outlet.

49. An ink-jet apparatus in accordance with claim 48 wherein said discharge surface comprises the surface of said secondary liquid contained in said container means and said means to maintain said discharge surface in said stable position comprises means to introduce said secondary fluid into said container means at a constant and controllable rate of flow thereby to maintain the diameter of said fine liquid droplets at a predetermined value.

50. An ink-jet apparatus in accordance with claim 41 wherein said container means comprises means to provide in said secondary fluid a primary liquid stream inlet surface equivalent to said predetermined thickness of said thin layer of said secondary fluid.

51. An ink-jet apparatus in accordance with claim 40 wherein said means to provide said thin layer of said secondary fluid comprises, in combination,
 (a) a source of said secondary fluid;
 (b) means defining a secondary fluid inlet passage;
 (c) means defining a secondary fluid supply passage of a size and configuration such that said discharge surface of said secondary fluid is formed thereacross through the forces of surface tension and serves as said limit of said thin layer;
 (d) primary liquid supply means extending into said secondary fluid supply passage, terminating in said nozzle means and positioned so that said outlet of said nozzle means is spaced from said discharge surface by a distance equal to said predetermined thickness of said thin layer;
 (e) sheath means surrounding and supporting said primary liquid supply means, terminating short of said nozzle means and defining within said supply passage a terminal secondary fluid volume terminating in said discharge surface; and a fluid passage of restricted cross section joining said secondary fluid inlet passage and said terminal fluid volume; and
 (f) pump means arranged to deliver said secondary fluid from said source to said fluid inlet passage.

52. An ink-jet apparatus in accordance with claim 51 including means defining a fluid pressure cushion arranged to maintain the fluid pressure on said secondary fluid in said fluid supply passage constant.

53. An ink-jet apparatus in accordance with claim 51 including means to periodically vary the fluid pressure on said secondary fluid in said fluid supply passage thereby to shift the position of said discharge surface relative to said outlet of said nozzle means and change the thickness of said thin layer and the diameter of said fine liquid droplets.

54. An ink-jet apparatus in accordance with claim 51 including means to damp out pressure waves in said secondary fluid in said fluid supply passage.

55. An ink-jet apparatus in accordance with claim 54 wherein said fluid passage of restricted cross section serves as said means to damp out said pressure waves.

56. An ink-jet apparatus in accordance with claim 54 wherein said means to damp out said pressure waves comprises a porous medium located in said fluid passage of restricted cross section.

57. An ink-jet apparatus in accordance with claim 40 including means to move said nozzle means back and forth thereby to change the direction of said compound jet of fine liquid droplets.

58. An ink-jet apparatus in accordance with claim 57 wherein said nozzle means is maintained in contact with said secondary fluid.

59. An ink-jet apparatus in accordance with claim 40 wherein said means to provide said thin layer of said secondary fluid is arranged to maintain said secondary fluid under essentially atmospheric pressure.

60. A method in accordance with claim 40 including the step of maintaining said secondary fluid, through the forces of surface tension, across an aperture thereby providing said free compound jet discharge surface.

61. A method in accordance with claim 60 wherein the diameter of said aperture is at least five times the diameter of said nozzle.

62. A method in accordance with claim 40 wherein said secondary fluid is different from said primary liquid.

63. An ink-jet recording system comprising in combination,
 (a) a nozzle;
 (b) means to provide a thin layer of a secondary liquid adjacent the outlet of said nozzle, said thin layer being of a predetermined thickness and having a compound jet discharge surface;
 (c) a source of a primary liquid;
 (d) means to direct said primary liquid under pressure from said source through said nozzle thereby to eject a primary liquid stream from said nozzle through said secondary liquid, whereby the resulting compound stream forms a compound jet of fine liquid droplets at a drop formation point beyond the limit of said thin layer;
 (e) receptor surface means;
 (f) a source of signals; and
 (g) droplet control means responsive to said signals to control the deposition of said fine liquid droplets on said receptor surface means.

64. An ink-jet recording system in accordance with claim 63 wherein said means to provide said thin layer of said secondary liquid adjacent the outlet of said nozzle comprises, in combination,
 (a) container means arranged to provide a volume of said secondary liquid and defining said compound jet discharge surface;

(b) means to maintain said outlet of said nozzle in spaced relationship to said compound jet discharge surface.

65. An ink-jet recording system in accordance with claim 63 wherein said droplet control means comprises droplet charging means to charge at least selected ones of said fine liquid droplets and electrode means positioned between said drop formation point and said receptor surface means.

66. An ink-jet recording system in accordance with claim 65 including means to impart a vibratory motion to either said primary or secondary liquid prior to the formation of said primary liquid stream.

67. An ink-jet recording system in accordance with claim 65 wherein said droplet charging means are responsive to said signals to charge selected ones of said droplets and said electrode means are arranged to disperse said selected ones of said droplets from the axis of said stream thus achieving on-off modulation.

68. An ink-jet recording system in accordance with claim 65 wherein said droplet charging means are responsive to said signals to charge selected ones of said droplets and said electrode means comprise electrostatic deflecting electrodes defining a constant electrostatic field therebetween, the magnitude of which controls the final deposition of said drops onto said receptor surface means.

69. An ink-jet recording system in accordance with claim 65 wherein said means to provide said thin layer of said secondary liquid comprise, in combination, (a) a source of said secondary liquid;
(b) means defining a secondary liquid inlet passage;
(c) means defining a secondary liquid supply passage of a size and configuration such that a continuous surface of said secondary liquid is formed thereacross through the forces of surface tension and serves as said compound jet discharge surface;
(d) primary liquid supply means extending into said secondary liquid supply passage, terminating in said nozzle means and positioned so that said outlet of said nozzle is spaced from said continuous surface by a distance equal to said predetermined thickness of said thin layer;
(e) sheath means surrounding and supporting said primary liquid supply means, terminating short of said nozzle means, and defining within said supply passage a terminal secondary liquid volume terminating in said continuous surface; and a liquid passage of restricted cross section joining said secondary liquid inlet passage and said terminal liquid volume; and
(f) pump means arranged to deliver said secondary liquid from said source to said fluid inlet passage.

70. An ink-jet recording system in accordance with claim 69 including means defining a fluid pressure cushion arranged to maintain the fluid pressure on said secondary liquid in said liquid supply passage constant.

71. An ink-jet recording system in accordance with claim 69 including means to periodically vary the fluid pressure on said secondary liquid in said liquid supply passage thereby to shift the position of said continuous surface relative to said outlet of said nozzle means and change the thickness of said thin layer and the diameter of said fine droplets.

72. An ink-jet recording system in accordance with claim 69 including means to damp out pressure waves in said secondary liquid in said liquid supply passage.

73. An ink-jet recording system in accordance with claim 72 wherein said liquid passage of restricted cross section serves as said means to damp out said pressure waves.

74. An ink-jet recording system in accordance with claim 72 wherein said means to damp out said pressure waves comprises a porous medium located in said liquid passage of restricted cross section.

75. An ink-jet recording system in accordance with claim 63 including means to move said nozzle back and forth thereby to change the direction of said compound jet of fine liquid droplets.

76. An ink-jet recording system in accordance with claim 75 wherein said nozzle is maintained in contact with said secondary fluid.

* * * * *